United States Patent [19]

Mills

[11] Patent Number: 5,654,617

[45] Date of Patent: Aug. 5, 1997

[54] WINDSHIELD WIPER CONTROLLER AND METHOD

[76] Inventor: Manual D. Mills, P.O. Box 1073, Midland, Tex. 79702

[21] Appl. No.: 529,526

[22] Filed: Sep. 18, 1995

[51] Int. Cl.$^6$ .................................................. B60S 1/08
[52] U.S. Cl. .................... 318/444; 318/443; 318/483; 318/DIG. 2
[58] Field of Search .................... 318/139, 440–470, 318/DIG. 2, 260–266, 54; 15/250.13, 250.16, 250.14, DIG. 15, 250.17, 250.12; 364/424.05; 307/10.8

[56] References Cited

U.S. PATENT DOCUMENTS

| | | | |
|---|---|---|---|
| Re. 33,308 | 8/1990 | Millerd et al. | 318/444 |
| Re. 33,848 | 3/1992 | Shiraishi | 318/444 |
| 4,527,105 | 7/1985 | Shiraishi | 318/444 |
| 4,656,363 | 4/1987 | Carter et al. | 307/10.8 |
| 4,663,575 | 5/1987 | Juzswik et al. | 318/444 |
| 4,705,998 | 11/1987 | Millerd et al. | 318/444 |
| 4,710,878 | 12/1987 | Iyoda | 318/444 |
| 4,866,357 | 9/1989 | Miller et al. | 318/444 |
| 4,873,635 | 10/1989 | Mills . | |
| 4,942,349 | 7/1990 | Millerd et al. | 318/483 |
| 5,027,001 | 6/1991 | Torbert | 307/10.8 |
| 5,057,754 | 10/1991 | Bell | 318/483 |
| 5,120,981 | 6/1992 | Cope | 307/10.8 |
| 5,177,418 | 1/1993 | Muller | 318/265 |
| 5,216,341 | 6/1993 | Nomura et al. | 318/444 |
| 5,252,898 | 10/1993 | Nolting et al. | 318/444 |
| 5,355,061 | 10/1994 | Forhan | 318/443 |
| 5,374,852 | 12/1994 | Parkes | 307/10.8 |
| 5,424,585 | 6/1995 | Geraghty | 307/10.8 |
| 5,444,307 | 8/1995 | Sheets et al. | 307/10.8 |
| 5,506,483 | 4/1996 | McCann et al. | 318/444 |

OTHER PUBLICATIONS

Technical Highlight: Cadillac CV–RSS, 1 p.

*Primary Examiner*—Paul Ip
*Attorney, Agent, or Firm*—Browning Bushman

[57] ABSTRACT

A windshield wiper controller 10 is provided for automatically regulating the operating speed of a motor powering a windshield wiper. An automatically set or manually set wiper speed selector 36, 48 is provided for selecting a wiper speed setting to initially control the operating speed of the windshield wiper motor. A sensor 22 senses the actual speed of the windshield wiper movement relative to the windshield. Controller 32 is responsive to the sensor 22 and automatically generates a wiper speed increase signal to the selector when the sensed wiper speed is less than a selected value, and similarly generates a wiper speed reduce signal when the sensed wiper speed is greater than a selected value. The wiper speed sensor 22 may include a magnet 20 which acts as a triggering mechanism outputting a signal from the wiper sensor. A timer 44 measures the time interval between at least a substantial portion of the forward wiping motion and the return wiping motion. The windshield wiper controller 10 may also include a light controller 40 and a rear light blinker 42 for automatically activating the vehicle driving lights and rear lights to increase the visibility of the vehicle to other drivers.

20 Claims, 1 Drawing Sheet

WINDSHIELD WIPER CONTROLLER AND METHOD

FIELD OF THE INVENTION

The present invention relates to devices and methods for controlling the speed of a windshield wiper moving across a windshield. More particularly, this invention relates to a windshield wiper controller and method which will automatically increase or decrease the wiper movement as a function of the precipitation on the windshield, thereby allowing the vehicle operator to concentrate on safely driving the vehicle. The present invention also allows the vehicle to be more easily seen by other vehicle operators when driving during a downpour or a heavy snow condition.

DESCRIPTION OF THE BACKGROUND

Most adults are familiar with manually actuated selector mechanisms for altering the speed of windshield wiper movement. When driving during a mist, the driver may set the selector mechanism at a slow speed to keep the windshield substantially free from precipitation, while neither distracting the driver with unnecessary wiping nor causing excessive wear on the wipers. When driving in a moderate rain, the selector mechanism is set at an intermediate speed. Only during a heavy rain condition will the driver set the wiper selector mechanism at its fastest or maximum speed. In recent years, an intermittent controller has been added to many vehicles, which allows the wipers to pause between wiper movements at a slow speed. During a light mist, the operator may adjust the intermittent controller for a relatively long pause, thereby allowing the precipitation to accumulate on the windshield before wiping. During a heavier mist, the intermittent controller may be adjusted for a short pause, so that precipitation build-up on the windshield does not adversely impair the driver's sight.

Conventional windshield wiper control mechanisms frequently require monitoring and adjustment by the vehicle driver, since the precipitation rate when driving generally changes with time. When driving on a crowded freeway or a winding road through mountains, this frequent monitoring and adjustment by the driver is particularly distracting, and may lead to a serious accident. The driver's vision is frequently impaired because the wiper speed setting is too slow for the precipitation level. Excessive wiper speed significantly detracts from the useful life of the wipers, and more importantly is annoying and distracting to the vehicle driver. Adjusting the wiper speed usually requires the operator to take his or her eyes off the roadway at a time when the operator's attention should be solely directly to road conditions and adjacent vehicles.

A related problem with driving during raining or mowing conditions concerns the ability of other vehicle operators to timely observe your vehicle. Safety personnel generally recommend driving with headlights on low beam during these conditions, although many operators forget to turn on their headlights. Some operators may not believe it necessary to turn on their headlights during a light rain condition. When precipitation gradually increases, the operator fails to recognize that he or she is now driving during a heavy downpour with their headlights off. Also, when driving during a downpour or a heavy snow Condition, vehicle operators approaching from the rear may not see your vehicle until it is too late to avoid an accident. Even with the vehicle lights on, it is difficult to see the tail lights of many vehicles during a heavy precipitation condition.

The disadvantages of the prior art are overcome by this invention, which improves vehicle safety by automatically regulating the frequency of windshield wiper movement. The windshield wiper controller of this invention may also be used to increase the vehicle visibility for drivers in adjacent vehicles. This invention may be used to significantly improve the safety of driving a vehicle during precipitation conditions.

SUMMARY OF THE INVENTION

A windshield wiper controller is provided for automatically regulating the operating speed of a motor which powers a conventional windshield wiper on a vehicle. The motor conventionally moves the windshield wiper in a forward wiping motion and in the return wiping motion across the vehicle windshield, thereby enhancing operator visibility. The controller includes a wiper speed selector for selecting an initial wiper speed setting to control the operating speed of the motor powering the windshield wiper. The wiper speed selector may utilize a pre-selected initial wiper speed setting, or the vehicle operator may select an initial wiper speed setting. The controller also includes a wiper speed sensor for sensing the actual speed of the windshield wiper movement relative to the vehicle windshield. In a preferred embodiment, the wiper speed sensor comprises a magnet or other triggering member which is mounted on the windshield wiper, and a triggered sensor mounted on the windshield for generating a triggering signal when the triggering member moves past the triggered sensor. The triggering member thus acts as a wiper position sensor. A timer senses the time intervals between the successive triggering signals, thereby measuring the actual time interval between at least a substantial portion of the forward wiping motion and the return wiping motion of the windshield wipers.

The invention relies upon the change in friction between the moving wiper and the windshield as a function of the precipitation level on the windshield. This change in friction produces a relatively minor yet highly repeatable and thus predictable change in the velocity of the wiper blade moving across the windshield. This velocity change thus results in a time variation for the wiper to sweep in a full cycle through a forward wiping motion and the return wiping motion as a function of the precipitation level. With less precipitation and increased friction, the time interval during these motions thus increases, thereby automatically causing the controller to slow down in the wiper speed and prevent excessive wiping. Similarly, with more precipitation and reduced friction, this time interval decreases, thereby automatically causing the controller to increase the wiper speed when the time interval drops below a predetermined value. The windshield wiper may be powered by a conventional DC motor commonly used on most vehicle wiper systems.

Since an intermittent wiper system may be used to control the delay between wiping motions at a low wiping speed, the sensor preferably measures the time interval between at least a substantial portion of the forward wiping motion and the return wiping motion. The wiper speed selector may include a delay adjuster for regulating the selected time interval for deactivating the motor during the intermittent windshield wiper operation. In that event, the controller automatically generates a delay increase signal to increase the selected time interval the motor is deactivated, or a delay decrease signal to decrease the selected time interval the motor is deactivated, both a function of the sensed wiper speed.

The controller of the present invention also functions to increase driver safety by automatically activating the vehicle headlights and taillights when the sensed wiper speed exceeds a predetermined value. Thus the vehicle driving lights may automatically come "on" any time the windshield wipers are on for more than a predetermined time period, or any time the sensed wiper speed exceeds a predetermined value indicative of a precipitation level greater than a light rain or mist. During a heavy downpour, the controller may automatically activate the rear vehicle lights in a blinking fashion so that the taillights of the vehicle are more easily visible to another vehicle operator approaching from the rear.

The present invention further recognizes that the vehicle operator preferably has the ability to override the automatic control system. A conventional manually controlled wiper speed selector may thus be employed for generating a wiper speed override signal to the controller. The override signal generates a new wiper speed setting to the controller. If desired, the controller may thereafter adjust the selected value for the sensed wiper speed as a function of the override signal. In other words, the controller may assume that the operator wants the wiper speed at a selected value for a given precipitation condition, and the controller will automatically increase or decrease the wiper speed only when the sensed time interval thereafter changes beyond a selected value.

It is an object of the present invention to improve the safety of driving a vehicle during a precipitation condition by minimizing operator activity required to adjust the speed of the windshield wipers. A related object of the invention is to automatically adjust the windshield wiper speed as a function of the precipitation level, and specifically to adjust the windshield wiper speed as a function of the sensed actual speed of the windshield wiper, which is related to the precipitation level. The controller for adjusting the wiper speed according to the present invention is responsive to a sensor used to measure the velocity of the wiper movement, preferably over a substantial period of the forward wiping motion and the return wiping motion. In a preferred embodiment, the velocity sensor may include a position sensor and a timer for measuring the time interval between triggering signals from the position sensor. The controller compares the measured time to a preselected time interval for a selected wiper speed setting, and adjusts the wiper speed setting when the actual measured time exceeds a predetermined range. The windshield wiper controller of the present invention is thus responsive to varying precipitation conditions for automatically adjusting the windshield wiper speed setting.

It is an object of the invention to select a wiper speed setting to control the operating speed of a motor powering the windshield wiper, sensing the actual speed of the windshield wiper, and in response to the sensed actual speed, automatically increasing or decreasing the wiper speed when the sensed wiper speed exceeds a selected range.

It is a feature of the present invention that the windshield wiper speed automatically determined by the controller may be overridden by the vehicle operator. It is a related object of the invention to provide for automatic adjustment of the windshield wiper speed, while still allowing the vehicle operator to override the automatic control system and manually select the windshield wiper speed. Another feature of the invention is that the windshield wiper speed sensor measures the time interval between at least a substantial portion of the forward wiping motion and the return wiping motion of the windshield wiper. A related feature is that the windshield wiper speed controller may utilize an intermittent wiper feature, whereby the controller automatically increases or decreases the selected time interval for deactivating the wiper motor. Still another feature of the invention is that a moisture sensor may be provided for automatically activating the wiper motor.

Yet another feature of the invention is that high reliability is obtained by providing conventional components for sensing the actual speed of the windshield wiper. According to one embodiment, a magnet mounted on one of the windshield wiper blades and a sensor mounted on the inside of the windshield generates a triggering signal when the magnet moves past the sensor. Another feature of the invention is that the windshield wiper controller may be used for automatically activating the vehicle driving lights when the sensed wiper speed exceeds a selected value. An added feature of the invention is that the controller may automatically activate a blinker for flashing the rear vehicle lights in a blinking fashion when the sensed wiper speed exceeds a predetermined value.

It is an advantage of the present invention that the windshield wiper controller may be installed on existing vehicles. A related advantage of the invention is that the controller may be used on various types of vehicles manufactured by different car and truck manufacturers, thereby reducing the cost of the system. A further related advantage of the invention is the substantial savings achieved by manufacturing the windshield wiper controller as components of an originally manufactured vehicle, thereby further lowering the cost of the system.

These and further objects, features and advantages of the present invention would become apparent from the following detailed description, wherein reference is made to the figures in the accompanying drawings.

DETAILED DESCRIPTION OF THE PREFERRED EMBODIMENTS

Figure 1:
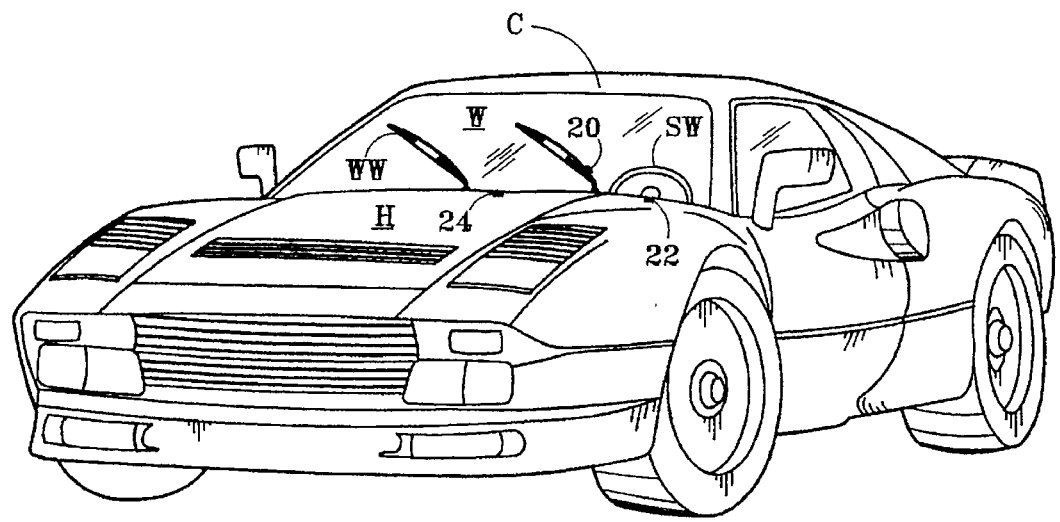
FIG. 1 is a simplified pictorial view of a portion of a vehicle illustrating a windshield wiper and a sensor for measuring the windshield wiper speed.

FIG. 1 simplistically depicts a portion of a car C including a conventional windshield W, a steering wheel SW and a hood H. The windshield wiper controller according to the present invention may be used on any type of vehicle, including cars and trucks which are provided with a windshield wiper WW powered by a direct current (DC) motor M and gearing assembly GA schematically shown in FIG. 2.

The wiper speed sensor may include a small magnet 20 mounted on the windshield wiper WW. A transducer 22 is mounted on the windshield and is responsive to the lines of magnetic flux affected by the magnet moving past the transducer. The transducer 22 will thus generate a triggering signal each time the magnet 20 moves past the transducer 22. In a preferred embodiment, the magnet is mounted on the windshield wiper WW and the transducer 22 is mounted on the windshield, although the components could be reversed and a magnet installed in a fixed position on the windshield W and the transducer movably mounted on the wiper WW. The components are preferably positioned so that the transducer measures the time interval between at least a substantial portion of the forward wiping motion and the return wiping motion of the windshield wiper WW relative to the windshield W.

FIG. 1 also illustrates a suitable position for the precipitation sensor 24 which detects a precipitation condition. The sensor 24 may be mounted at any convenient location on the exterior of the vehicle, and is shown mounted near the rear of the hood H in FIG. 1. Sensor 24 is a conventional sensor, such as that manufactured by Climatronics under Part No. 102124, and generates an activating signal when a circuit is closed by moisture indicative of a precipitation condition. When driving in a rain or snow condition, the precipitation sensor 24 thus automatically detects the precipitation condition, and optionally activates the controller discussed below.

Those skilled in the art will appreciate that various types of mechanisms may be used for detecting the windshield wiper speed, and that the magnet and transducer embodiment as disclosed above are representative of a suitable device. An optical sensor may be provided on the windshield to generate a triggering signal when the windshield wiper moves past the sensor. A light emitting diode may be provided on the windshield wiper, and will become activated any time the windshield wipers are operating. The light from the diode may thus be detected by the optical sensor.

Figure 2:
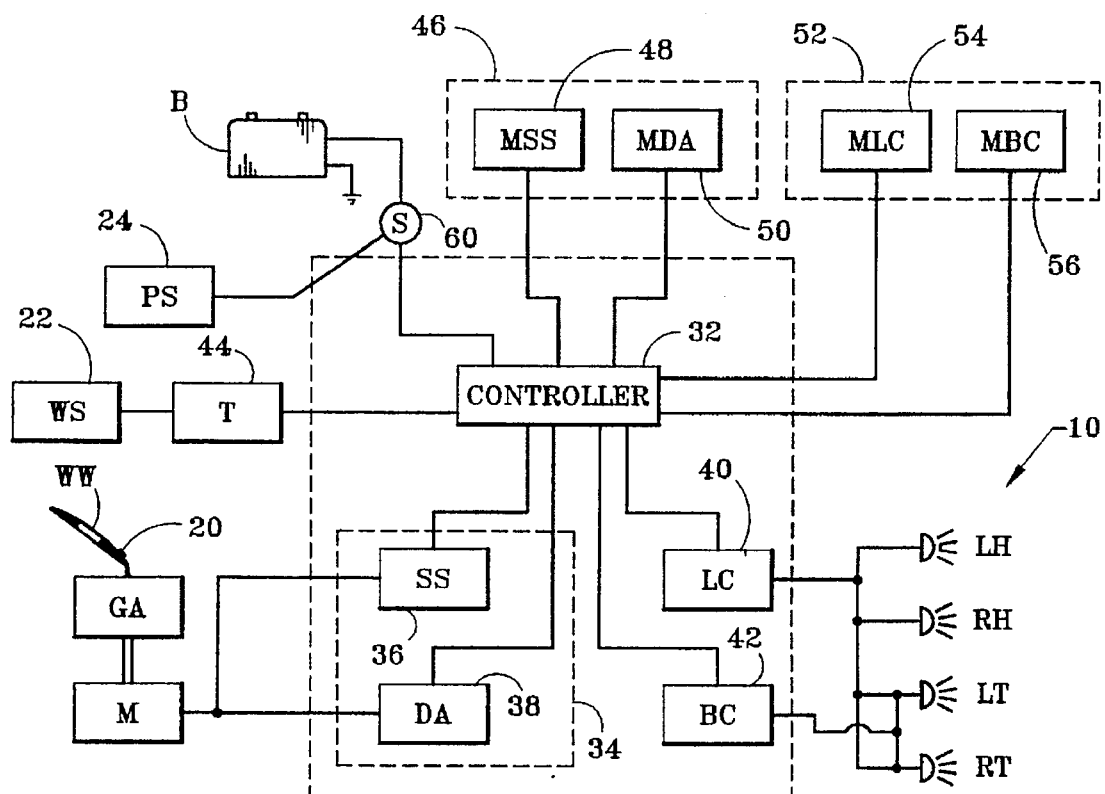
FIG. 2 is a block diagram of a suitable windshield wiper controller according to the present invention.

FIG. 2 illustrates a simplified block diagram of a suitable windshield wiper controller 10 according to this invention. The wiper sensor 22 discussed above thus outputs a triggering signal to timer 44, which preferably measures the time interval between the forward wiping motion and the return wiping motion. As explained subsequently, a windshield wiper intermittent control may be provided so that the motor M is briefly deactivated during a misting condition, and accordingly the time required for the windshield wiper WW to move during a complete cycle is preferably measured. Electronics package 30 is preferably provided within the interior of the vehicle, and may be fabricated as a computer chip to include a primary controller 32, an automatic wiper speed selector 36, an automatic delay adjuster 38, a vehicle light controller 40, a blinker controller 42 and timer 44.

In one simplistic form of the invention, a preferred time range between triggering signals from the timer 44 for each wiper setting is preselected within the controller. A preselected time range for each speed selector setting may thus be set by the vehicle manufacturer. For example, during a misting condition, speed selector 36 may anticipate receiving signals from the timer 44 varying from 7.1 seconds to 7.2 seconds. As long as the measured time signals are within that selected range, the speed setting from the selector 36 remains constant. If the precipitation level decreases, the windshield wiper WW will experience more friction, thereby causing an increase in the triggering signals to result in a measured time above 7.2 seconds, which then may result in a new wiper speed electronic signal to reduce the speed of the motor. On the other hand, if the timer 44 generates a time interval of 7.0 seconds or less between wiper strokes, controller 32 activates the speed selector to increase the wiper speed, thereby causing the motor M to operate at a faster rate.

The present invention relies upon the increased or reduced friction of the windshield wiper during different precipitation level conditions. The motor M which powers the windshield wiper WW is conventionally DC powered. It is conceivable that some type of electronic sensor might be used for monitoring the amperage used by the motor to measure the speed of the windshield wipers. A significant advantage of the embodiment discussed above is that the numerous variables which effect electronic consumption by the motor are irrelevant to the sensing technique, which instead preferably relies upon the increased or decreased friction to change the speed of the windshield wipers. That actual wiping speed is then detected to affect the windshield wiper setting.

The actual time between successive signals from the wiper sensor 22 will be dependent upon the placement of the wiper sensor on the windshield and thus the amount of the full cycle forward wiping motion and return wiping motion which is detected between successive triggering signals. Also, the selected wiper speed setting will obviously effect the actual time between triggering signals, regardless of the precipitation condition. Two different tests were conducted to illustrate the repeatability of the technique according to the present invention to detect a measurable time interval between triggering signals as a function of the precipitation condition. While the absolute time between triggering signals will be a function of the position of the sensor on the windshield and thus the percent of the full wiping cycle detected, the wiper speed setting, the wiper motor M, and the conditions of the windshield wipers WW, these conditions were maintained at a reasonably constant level during a rain, mist, and dry (no precipitation) condition for the tests. The results of each of those tests are provided below.

| TEST NO. 1 | | | |
| --- | --- | --- | --- |
| OPERATING CONDITIONS | RAIN CONDITION | MIST CONDITION | DRY CONDITION |
| TEST NO. 1 | 17.135 | 17.250 | 17.400 |
| TEST NO. 2 | 14.360 | 14.550 | 14.756 |
| TEST NO. 3 | 12.155 | 12.390 | 12.580 |
| TEST NO. 4 | 09.520 | 09.650 | 10.900 |
| TEST NO. 5 | 07.110 | 07.290 | 07.410 |
| TEST NO. 6 | 04.560 | 04.710 | 04.950 |
| TEST NO. 7 | 01.930 | 02.110 | 02.350 |
| TEST NO. 8 | 01.330 | 01.440 | 01.765 |
| TEST NO. 9 | 00.915 | 01.030 | 01.290 |
| | | TIME INTERVAL | |

| TEST NO. 2 | | | |
| --- | --- | --- | --- |
| OPERATING CONDITIONS | RAIN CONDITION | MIST CONDITION | DRY CONDITION |
| TEST NO. 1 | 17.140 | 17.250 | 17.360 |
| TEST NO. 2 | 12.115 | 12.390 | 14.458 |
| TEST NO. 3 | 11.980 | 12.130 | 12.258 |
| TEST NO. 4 | 09.390 | 09.525 | 09.672 |
| TEST NO. 5 | 07.010 | 07.153 | 07.386 |
| TEST NO. 6 | 04.541 | 04.680 | 04.825 |
| TEST NO. 7 | 01.930 | 02.130 | 02.245 |
| TEST NO. 8 | 01.330 | 01.550 | 01.690 |
| TEST NO. 9 | 09.500 | 01.063 | 01.340 |
| | | TIME INTERVAL | |

Based upon the above tests, it is clear that high reliability was obtained for a particular operating condition when the position of the wiper speed sensor and the setting remained unchanged. For operating Test No. 5, for example, the time interval of the tests during a rain condition changed from 7.110 seconds to 7.010 seconds. During the same operating condition and with only a change of the precipitation level, the time interval for a misting condition increased to 7.290 seconds and 7.153 seconds, respectively. During a dry condition, the time interval for this same test was 7.410 seconds and 7.386 seconds, respectively.

Under one preferred embodiment, the time interval input to the controller 32 will cause the controller to automatically set the initial output from the wiper speed selector 36, so that the wiper speed setting will properly coincide with the precipitation condition. As long as the time interval remains within a selected range, the signal from the wiper speed selector 36 to the motor will remain unchanged. If the sensed time interval decreases indicative of a heavier precipitation, the controller will send a wiper speed increase signal to the automatic selector 36, which will then output a signal to the motor M to increase the wiper speed. Similarly, if the time interval increases beyond the acceptable range, the controller 32 will produce a wiper speed reduce signal to the selector 36, which will then cause the motor M to decrease speed.

FIG. 2 also illustrates that the wiper speed selector mechanism 34 may include a delay adjuster 38 for regulating a selected time interval for deactivating the motor during a misting condition. The controller 32 may thus produce a motor delay increase signal when the sensed time interval decreases beyond a preferred range and the wiper speed is at its lowest continuous motor operation setting. The motor delay increase signal to the delay adjuster 36 will thus cause the delay adjuster 38 to increase the time interval for deactivating the motor M between a full wiping stroke, thereby allowing more precipitation to accumulate on the windshield before the next wiping motion. Similarly, the controller 32 may output a motor delay decrease signal when the time interval between successive triggering signals increases beyond the preselected range, thereby increasing the time interval the motor is deactivated between successive wiping motions.

It is a feature of the present invention that the electronics package includes a light controller 40 for automatically activating the vehicle driving lights when the sensed wiper speed exceeds a predetermined value. In a preferred embodiment, the light controller 40 automatically activates the vehicle headlights LH and RH and the vehicle taillights LT and RT any time the windshield wipers are activated for longer than a predetermined time (in excess of, for example, normal windshield cleaning). In another embodiment, the light controller 40 is only automatically activated if the sensed windshield wiper speed indicates a heavy rain condition. Electronics package 32 may also be provided with a rear light blinker 42 for automatically activating the rear lights LT and RT on the vehicle in a blinking fashion when the sensed wiper speed exceeds a predetermined value. During a heavy rain or heavy snow condition, many vehicles are rear-ended because another vehicle operator approaching from the rear cannot see a slow moving or stopped vehicle, even though the slow moving or stopped vehicle has its vehicle lights on. According to the present invention, the blinker 42 may be automatically activated and will result in a flashing of the vehicle taillights in response to the sensed wiper speed.

FIG. 2 illustrates a conventional battery B which provides electrical power to the electronics package 32. A switch 60 may be provided for automatically deactivating the controller 32, thereby allowing the windshield wipers and the vehicle lights to be controlled by the vehicle operator utilizing conventional controllers within the vehicle. When driving with no precipitation, the operator may thus turn the switch 60 off. When it begins to rain or snow, the operator may activate the switch 60 to turn on the electronics package 32. In one embodiment, the controller 32 may initially set the speed selector at a selected value, i.e., either a low or medium value. The signal from the speed selector 36 will thereafter be automatically adjusted in response to the precipitation conditions, as explained above. In another embodiment, precipitation sensor 24 is provided for automatically activating the switch 60 and thus initiating operation of the electronics package 32. Accordingly, the present invention envisions that an operator driving during a dry condition may encounter a misting condition, which will automatically turn on the electronics package 32 as a result of an activation signal from precipitation sensor 24. The controller will thereafter automatically increase or decrease the wiper speed as a function of the actual precipitation conditions. The vehicle operator thus need not be concerned with continually readjusting the wiper speed setting while driving.

The present invention envisions that the vehicle will be supplied with a standard wiper control package 46 which includes a manual wiper speed selector 48 and manual delay adjuster mechanism 50. These controls 48 and 50 are provided on most cars sold in recent years, and preferably will be included according to the present invention. Also, the interior of a vehicle may be provided with a conventional electronics package 52 which will include a manual light controller or light switch 54, and a manual blinker controller 56. Most vehicles come with a manual light controller (light switch), which includes both an on/off and a high beam/low beam selector. The manual blinker controller is conventionally not provided on vehicles, but may be structurally and operationally similar to the controller provided for manually activating the turn signalling lights on both the left side and the right side of the vehicle.

If the switch 60 is deactivated, the signals from controllers 48 and 50 will automatically pass through the controller 32 and to the windshield wiper motor M. Similarly, signals from controllers 54 and 56 will pass through the controller 32 which selectively activates or deactivates the vehicle lights and the taillights, respectively.

A particular feature of the invention allows the vehicle operator to generate an override signal which will provide input to the controller to adjust the operation of the system, which will thereafter be responsive to the desires of the operator. Accordingly, electronics package 30 becomes "smart" in the sense that it becomes tailored to the desires of the vehicle operator. According to one example, electronics package 30 may be automatically controlling the wiper speed, but the automatically controlled setting is slightly too fast for a particular vehicle operator. Accordingly, the vehicle operator uses the manually controlled wiper speed selector 48 to manually generate a wiper speed override signal which slows the wiper speed down to the setting selected by the operator. Alternatively, the signal from the manual selector 48 may slow down the wiper speed to the next slower setting. The controller 32 may also note the sensed time interval during this manual resetting operation, and assume that the vehicle operator wishes to maintain this wiper speed setting for that precipitation condition. The new wiper speed setting is thus set by the driver. However, if it thereafter begins to rain harder, the decrease in time between triggering signals from sensor 22 will automatically increase the wiper speed setting. Similar results are obtained when the operator manually operates the controller 50 to increase or decrease the delay signal during an intermittent windshield wiper operation.

Controller 54 may be activated for automatically actuating the vehicle driving lights at any time, whether in a precipitation or non-precipitation condition. Controller 54 may also allow the operator, if desired, to deactivate the vehicle driving lights under conditions when the light controller 40 would normally retain the vehicle lights on. Similarly, the manual blinker controller 56 may be activated for bypassing the electronics package to turn the rear blinker lights on in a blinking fashion during non-precipitation conditions, such as a light fog or driver emergency condition. Manual controller 56 may also allow the vehicle operator to deactivate the rear taillights under conditions where the blinker controller 42 would normally have the rear taillights operating in a blinking condition. The vehicle driver may thus be driving during a heavy downpour but in rush hour stop-and-go traffic, in which case the rear taillight blinking may be deactivated.

According to the method of the invention, the general operating speed of the motor is regulated by selecting a wiper speed setting, while the actual speed of the windshield wiper relative to the windshield is sensed and, in response to the sensed actual speed, the selector speed is adjusted. The selector speed is automatically increased when the sensed speed is less than a selected value, and is automatically decreased when the selected speed setting is greater than a selected value. As previously indicated, the step of sensing the actual wiper speed preferably comprises measuring the time interval between at least a substantial portion of the forward wiping motion and the return wiping motion of the windshield wiper. The method of the invention also includes automatically activating the vehicle driving lights and automatically activating the rear running lights on the vehicle in a blinking fashion, as explained above. The method further contemplates manually generating a wiper speed override signal, and automatically adjusting the selected wiper speed setting as a function of the override signal.

One skilled in the art having the above disclosure will be able to program a suitable computer to achieve the purposes of the invention. A particular feature of the invention is that the controller may be installed at a nominal cost when manufacturing a new vehicle, although the controller may be provided as a kit for existing vehicles.

It should be understood that the foregoing disclosure and description of the invention are illustrative, and changes in both the apparatus of the controller and in the method of controlling the windshield wiper speed as described above may be made without departing from the invention.

What is claimed is:

1. A windshield wiper controller for regulating the operating speed of a motor powering a windshield wiper in a forward wiping motion and a return wiping motion across a vehicle windshield, the windshield wiper controller comprising:

a wiper speed selector for selecting a wiper speed setting to control the operating speed of the motor powering the windshield wiper;

a wiper speed sensor for sensing the actual time of the windshield wiper movement relative to a stationary position on the vehicle windshield; and a controller responsive to the windshield speed sensor for automatically generating a wiper speed increase signal to the motor when the sensed wiper time is less than a selected value, and for generating a wiper speed reduce signal to the motor when the sensed wiper time is greater than a selected value.

2. The windshield wiper controller as defined in claim 1, wherein the wiper speed sensor measures the time interval between at least a substantial portion of the forward wiping motion and the return wiping motion of the windshield wiper relative to the windshield.

3. The windshield wiper controller as defined in claim 1, wherein the wiper speed sensor comprises:

a triggering member mounted on one of the windshield or the windshield wiper;

a triggered sensor mounted on the other of the windshield or windshield wiper for generating a triggering signal when the triggering member moves past the triggered sensor; and a timer for sensing the time interval between successive triggering signals.

4. A windshield wiper controller as defined in claim 3, further comprising:

the triggering member is a magnet mounted on the windshield wiper; and the triggered sensor is mounted on the inside of the windshield and generates a triggering signal in response to proximity between the magnet and the triggered sensor.

5. The windshield wiper controller as defined in claim 1, wherein:

the wiper speed selector includes a delay adjuster for regulating a selected time interval for de-activating the motor; and the controller automatically generates a delay increase signal to increase the selected time interval and a delay decrease signal to decrease the selected time interval as a function of the sensed wiper speed.

6. The windshield wiper controller as defined in claim 1, further comprising:

a light controller for automatically activating the vehicle driving lights in response to the sensed wiper speed.

7. The windshield wiper controller as defined in claim 1, further comprising:

a rear light blinker for automatically activating rear lights on the vehicle in a blinking fashion when the sensed wiper speed exceeds a predetermined value.

8. The windshield wiper controller as defined in claim 1, further comprising:

a manually controlled wiper speed selector for manually generating a wiper speed override signal;

the wiper speed selector is responsive to the wiper speed override signal for generating the wiper speed setting; and the controller adjusts the selected value of the sensed wiper setting for the selector as a function of the wiper speed override signal.

9. A windshield wiper controller for regulating the operating speed of a motor powering a windshield wiper in a forward wiping motion and a return wiping motion across a vehicle windshield, the windshield wiper controller comprising:

a wiper speed selector for selecting a wiper speed setting to control the operating speed of the motor powering the windshield wiper;

a wiper speed sensor for sensing the speed of the windshield wiper movement relative to a stationary position on the vehicle windshield, the wiper speed sensor including a triggering member mounted on one of the windshield or the windshield wiper, a triggered sensor mounted on the other of the windshield or windshield wiper for generating a start-time triggering signal when the triggering member moves past the triggered sensor during the forward wiping motion and a stop-time triggering signal when the triggering member moves past the triggered sensor during the return wiping motion, and a timer for sensing the time interval between successive triggering signals; and a controller responsive to the windshield speed sensor for automatically generating a wiper speed increase signal to the motor when the sensed wiper speed is less than a selected value, and for generating a wiper speed reduce signal to the motor when the sensed wiper speed is greater than a selected value.

10. The windshield wiper controller as defined in claim 9, wherein one of the triggering member and triggered sensor mounted on the windshield is positioned such that the time sensor measures the time interval between at least a substantial portion of the forward wiping motion and the return wiping motion of the windshield wiper relative to the windshield.

11. The windshield wiper controller as defined in claim 9, wherein:

the wiper speed selector includes a delay adjuster for regulating a selected time interval for de-activating the motor; and the controller automatically generates a delay increase signal to increase the selected time interval and a delay decrease signal to decrease the selected time interval as a function of the sensed wiper speed.

12. The windshield wiper controller as defined in claim 9, further comprising:

a precipitation sensor on the vehicle for automatically activating the wiper speed selector and the controller in response to detecting a precipitation condition.

13. The windshield wiper controller as defined in claim 9, further comprising:

a light controller for automatically activating the vehicle driving lights in response to the sensed wiper speed; and a rear light blinker for automatically activating rear lights on the vehicle in a blinking fashion when the sensed wiper speed exceeds a predetermined value.

14. The windshield wiper controller as defined in claim 9, further comprising:

a manually controlled wiper speed selector for manually generating a wiper speed override signal;

the wiper speed selector is responsive to the wiper speed override signal for generating the wiper speed setting; and the controller adjusts the selected value for the sensed wiper setting for the selector as a function of the wiper speed override signal.

15. A method of regulating the operating speed of a motor powering a windshield wiper in a forward wiping motion and a return wiping motion across a vehicle windshield, the method comprising:

selecting a wiper speed setting to control the operating speed of the motor powering the windshield wiper;

sensing the actual speed of the windshield wiper relative to a stationary position on the windshield; and in response to the windshield wiper sensed actual speed, automatically increasing the motor speed when the sensed wiper speed is greater than selected value, and automatically decreasing the motor speed when the sensed wiper speed is less than a selected value.

16. The method as defined in claim 15, wherein sensing the actual wiper speed comprises:

measuring the time interval between at least a substantial portion of the forward wiping motion and the return wiping motion of the windshield wiper relative to the windshield.

17. The method as defined in claim 15, wherein sensing the actual wiper speed comprises:

mounting a triggering member on one of the windshield or the windshield wiper;

mounting a triggered sensor on the other of the windshield or windshield wiper;

generating a triggering signal when the triggering member moves past the triggered sensor; and sensing the time interval between successive triggering signals.

18. The method as defined in claim 15, further comprising:

regulating a selected time interval for de-activating the motor; and automatically generating a delay increase signal to increase the selected time interval and a delay decrease signal to decrease the selected time interval as a function of the sensed wiper speed.

19. The method as defined in claim 15, further comprising:

automatically activating the vehicle driving lights when the sensed wiper speed exceeds a first predetermined value; and automatically activating rear lights on the vehicle in a blinking fashion when the sensed wiper speed exceeds a second predetermined value.

20. The method as defined in claim 15, further comprising:

manually generating a wiper speed override signal; and automatically adjusting the selected wiper speed setting as a function of the wiper speed override signal.

* * * * *